United States Patent
Tofuku et al.

(10) Patent No.: US 7,135,223 B2
(45) Date of Patent: *Nov. 14, 2006

(54) TRANSPARENT CONDUCTIVE LAYERED STRUCTURE AND METHOD OF PRODUCING THE SAME, AND TRANSPARENT COAT LAYER FORMING COATING LIQUID USED IN THE METHOD OF PRODUCING THE SAME, AND DISPLAY DEVICE TO WHICH TRANSPARENT CONDUCTIVE LAYERED STRUCTURE IS APPLIED

(75) Inventors: Atsushi Tofuku, Ichikawa (JP); Masaya Yukinobu, Ichikawa (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/694,753

(22) Filed: Oct. 29, 2003

(65) Prior Publication Data

US 2004/0091731 A1    May 13, 2004

Related U.S. Application Data

(62) Division of application No. 09/910,883, filed on Jul. 24, 2001, now Pat. No. 6,673,142.

(30) Foreign Application Priority Data

Jul. 25, 2000    (JP)    ............................. 2000-224500

(51) Int. Cl.
*B32B 5/16*    (2006.01)
*B32B 9/04*    (2006.01)

(52) U.S. Cl. ...................... 428/323; 428/220; 428/448; 428/699; 428/701; 428/702

(58) Field of Classification Search ................ 428/402, 428/403, 446, 447, 448, 688, 689, 701, 702 428/220, 332, 426, 428, 429
See application file for complete search history.

(56) References Cited

U.S. PATENT DOCUMENTS 5,013,607 A * 5/1991 Sato et al. .................. 428/426
5,766,673 A    6/1998 Nogami et al.
5,853,869 A * 12/1998 Adachi et al. .............. 428/325
6,261,479 B1 * 7/2001 Yukinobu et al. ........... 428/403
2001/0024685 A1 * 9/2001 Boulton et al. ............. 427/162

FOREIGN PATENT DOCUMENTS

| JP | 8-77832 A | 3/1996 |
|---|---|---|
| JP | 9-55175 A | 2/1997 |
| JP | 10-40834 A | 2/1998 |
| JP | 11-228872 A | 8/1999 |
| JP | 2000-268639 | 9/2000 |
| JP | 2001-126540 A | 5/2001 |

OTHER PUBLICATIONS

Machine translation JP 10-040834, 22 pages.*

* cited by examiner

*Primary Examiner*—Jennifer C. McNeil
*Assistant Examiner*—G. Blackwell
(74) *Attorney, Agent, or Firm*—Oliff & Berridge, PLC

(57) ABSTRACT

A transparent conductive layered structure which has the functions of preventing electrostatic charging or shielding an electric field, and preventing reflection, the two-layered film of which has an excellent scratch strength, and with which a reduction in production cost is expected and a method of producing the same, and a transparent coat layer forming coating liquid used in the method of producing the same, and a display device to which the transparent conductive layered structure is applied, are provided. A transparent conductive layered structure of the present invention, comprises a transparent substrate and a transparent two-layered film being composed of a and a transparent coat layer being formed in succession on the transparent substrate, wherein the transparent conductive layer comprises, as its main components, conductive microparticles having a mean particle diameter of 1 to 100 nm and a binder matrix of silicon oxide, and wherein the transparent coat layer comprises, as its main component, a binder matrix of silicon oxide including one or more types of alkyl groups selected from long chain alkyl groups containing 7 to 30 carbon atoms.

5 Claims, No Drawings

TRANSPARENT CONDUCTIVE LAYERED STRUCTURE AND METHOD OF PRODUCING THE SAME, AND TRANSPARENT COAT LAYER FORMING COATING LIQUID USED IN THE METHOD OF PRODUCING THE SAME, AND DISPLAY DEVICE TO WHICH TRANSPARENT CONDUCTIVE LAYERED STRUCTURE IS APPLIED

This is a Divisional of Application Ser. No. 09/910,883 filed on Jul. 24, 2001 now U.S. Pat. No. 6,673,142, The entire disclosure of the prior application is hereby incorporated by reference herein in its entirety.

BACKGROUND OF THE INVENTION

1. Field of the Invention

The present invention relates to a transparent conductive layered structure comprising a transparent substrate and a transparent two-layered film being composed of a transparent conductive layer and a transparent coat layer being formed in succession on the transparent substrate, which is used in front panels, etc., of display devices such as Braun tubes (CRTs), plasma display panels (PDPs), vacuum fluorescent display (VFDs), liquid crystal displays (LCDs). The present invention particularly relates to a transparent conductive layered structure having the functions of preventing electrostatic charging or shielding an electric field, and preventing reflection, the two-layered film of which has an excellent scratch strength, and with which a reduction in production cost is expected and a method of producing the same, and a transparent coat layer forming coating liquid used in the method of producing the same, and a display device to which the transparent conductive layered structure is applied.

2. Description of the Related Art

Many OA devices have been introduced to the office as a result of office automation (OA) in recent years and an environment in which the entire day work must be done facing the display of OA device is no longer uncommon.

However, when a job is done next to a cathode ray tube (referred to as the above-described Braun tube: CRT) of a computer, etc., as an example of OA equipment, it must be easy to see the display screen in order to prevent visual fatigue, as well as prevent deposition of dust and electric shock induced by the electrostatic charge on the CRT screen, etc. Furthermore, in addition to these requirements, etc., there has recently been concern over the detrimental effects of low-frequency electromagnetic waves generated by CRTs on the human body and there is a demand for CRTs with which there is no leakage to the outside of such electromagnetic waves.

As measures for such prevention of electrostatic charging or prevention of leakage of electromagnetic waves (electric field shielding), there have been adopted conventionally a method of coating the front panel surface of a CRT, etc., with a transparent conductive layer, and other methods.

Additionally, it is desired that surface resistance of these transparent conductive layers be in the order of $10^7$ to $10^{11}$ $\Omega/\square$ (ohm per square) for prevention of electrostatic charging, and be at least no more than $10^6$ $\Omega/\square$ for prevention of leakage of electromagnetic waves, preferably no more than $5\times10^3$ $\Omega/\square$, and more preferably no more than $10^3$ $\Omega/\square$.

Therefore, several suggestions have been made thus far for meeting these requirements, but of these, the method wherein a coating liquid for forming a transparent conductive layer prepared by dispersing conductive microparticles in a solvent is applied to the front glass of a CRT and dried, and a coating liquid for forming a transparent coat layer comprising as its main component an inorganic binder such as silica sol, and then baked at a temperature of the order of 200° C. is known as a method with which low cost and low surf ac resistance can be realized.

This method that uses a coating liquid for forming a transparent conductive layer is very simple when compared to other methods of forming transparent conductive layers, such as vacuum evaporation and sputtering, has a low production cost, and is a very useful method.

Moreover, for the above-mentioned transparent microparticles, there are used transparent conductive oxide microparticles such as tin antimony oxide (ATO) or indium tin oxide or metal microparticles, etc. For example, in the case of application of ATO, because surface resistance of the film that is obtained is in the order of $10^7$ to $10^{10}$ $\Omega/\square$, the film is used for preventing electrostatic charging.

In addition, although a coating liquid for forming a transparent conductive layer employing indium tin oxide is used for shielding an electric field, surface resistance of the film that is obtained is in the order of $10^4$ to $10^6$ $\Omega/\square$, which is insufficient to block leakage of an electric field, therefore a corrective circuit for canceling the electric field is needed.

On the other hand, when compared to coating liquids that use ITO, a film with somewhat lower transmittance, but also low resistance of $10^2$ to $10^3$ $\Omega/\square$, is obtained with coating liquids for forming transparent conductive layers that use metal microparticles for the above-mentioned conductive microparticles so that shielding an electric field can be performed without use of the above-mentioned corrective circuit.

Moreover, the metal microparticles that are used in the above-mentioned coating liquid for forming the above-mentioned transparent conductive layer are limited to noble metals, such as sliver, gold, platinum, rhodium, palladium, etc. that rarely oxidize in air, as shown in Japanese Patent Applications Laid-Open No. H 8-77832 and Laid-Open No. H 9-55175. This is because if microparticles of a metal other than a noble metal, such as iron, nickel, cobalt, etc., are used, an oxide film is invariably formed on the surface of such metal microparticles in an air atmosphere and good conductivity cannot be obtained as a transparent conductive layer.

Moreover, on the other hand, in order to make the display screen easy to see, anti-glare treatment is performed on the face panel surface to prevent reflection on the screen. This antiglare treatment is performed by the method whereby fine irregularities are made in the surface in order to increase diffused reflection at the surface, but it cannot be said that this method is a very desirable method because when used, resolution decreases and picture quality drops.

Consequently, it is preferred that antiglare treatment be performed by the interference method whereby the refractive index and film thickness of the transparent film be controlled so that there is destructive interference of the incident light by the reflected light.

A two-layered film structure wherein optical film thickness of film with a high refractive index and film with a low refractive index has been set at $\frac{1}{4}\lambda$ and $\frac{1}{4}\lambda$, or $\frac{1}{2}\lambda$ and $\frac{1}{4}\lambda$, respectively, is usually used in order to obtain this type of low-reflection effect of the Interference method, and film consisting of the above-mentioned indium tin oxide (ITO) microparticles is also used as this type of film with a high refractive index.

Furthermore, of the optical constant (n–ik, n: refractive index, $i^2=-1$, k: extinction coefficient) of metals, the value of n is small, but the value of k is very large when compared to ITO and therefore, even if a transparent conductive layer consisting of metal microparticles is used, the same anti-reflection activity induced by interference of light as seen with ITO is obtained with the two-layered film structure.

Moreover, in recent years, in addition to the properties such as the above-mentioned good conductivity, low reflectance, etc., this type of transparent conductive layered structure is requested to have the property of improving the contrast of images by adjusting the transmittance to the predetermined range (40 to 75%) lower than 100% in order to make the display screen easier to see. In this case, the mixing of color pigment microparticles, etc., into the above-mentioned coating liquid for forming a transparent conductive layer also has been performed.

In addition to this, as treatment for water resistance, brine resistance or anti-smudge of these transparent conductive layers, several attempts to make the layers water-repellent have been carried out recently.

Such a transparent conductive layered structure having a transparent two-layered film being composed of a transparent conductive layer and a transparent coat layer is produced, as mentioned above, by applying a coating liquid for forming a transparent conductive layer on a transparent substrate, and drying, and applying a coating liquid for a transparent coat layer as its main components silica sol, etc., and then conducting a heat treatment at a temperature of the order of 200° C.

Moreover, because the above-mentioned transparent coat layer comprises as its main component silicon oxide, the layer is formed as a film of relatively high strength by heat treatment at a temperature of the order of 200° C.

However, depending on the producers or makers of CRTs, there are cases where the above-mentioned heat treatment temperature is performed only under the condition of the order of 160° C. because of the limitation of facility aspect, etc., so that the strength of some transparent coating films may be insufficient due to the low temperature heating.

Similarly, for a coating liquid for forming a transparent conductive layer using the above-mentioned noble metal microparticles, the coating strength of some transparent two-layered films that are obtained is insufficient. It is considered that this is because when compared to conductive oxide microparticles such as ITO, etc. noble metal microparticles are chemically inert, and thus the binding between noble metal microparticles and an inorganic binder matrix is not so strong, and therefore the coating strength of the transparent two-layered films decreases.

SUMMARY OF THE INVENTION

The present invention focuses on such problems, its object being to present a transparent conductive layered structure having the functions of preventing electrostatic charging or shielding an electric field, and preventing reflection, the two-layered film of which has an excellent scratch strength (namely coating strength), and with which a reduction in production cost is expected and a method of producing the same, and a transparent coat layer forming coating liquid used in the method of producing the same, and a display device to which the transparent conductive layered structure is applied.

That is, a first aspect of the invention resides in a transparent conductive layered structure, comprising a transparent substrate and a transparent two-layered film being composed of a transparent conductive layer and a transparent coat layer being formed in succession on the substrate, wherein the transparent conductive layer comprises, as its main components, conductive microparticles having a mean particle diameter of 1 to 100 nm and a binder matrix of silicon oxide, and wherein the transparent coat layer comprises, as its main component, a binder matrix of silicon oxide including one or more types of alkyl groups selected from long chain alkyl groups containing 7 to 30 carbon atoms.

A second aspect of the invention resides in a transparent conductive layered structure according to the first aspect, wherein the conductive mircoparticles are transparent conductive oxide microparticles or/and noble metal microparticles.

A third aspect of the invention resides in a transparent conductive layered structure according to the second aspect, wherein the transparent conductive oxide microparticles are indium tin oxide or tin antimony oxide.

A fourth aspect of the invention resides in a transparent conductive layered structure according to the second aspect, wherein the noble metal microparticles are any of: noble metal microparticles selected from gold, silver, platinum, palladium, rhodium, and ruthenium; alloy microparticles of these noble metals; or noble metal-coated silver microparticles the surface of which is coated with these noble metals other than silver.

A fifth aspect of the invention resides in a transparent conductive layered structure according to the fourth aspect, wherein the noble metal-coated silver microparticles are silver microparticles coated with gold or platinum only or a composite of gold and platinum.

Next, additional aspects relate to methods of producing the transparent conductive layered structure.

A sixth aspect of the invention resides in a method of producing the transparent conductive layered structure according to the first aspect, comprising the steps of:

applying on a transparent substrate a transparent conductive layer forming coating liquid comprising, as its main components, a solvent and conductive microparticles having a mean particle diameter of 1 to 100 nm dispersed in the solvent;

then applying a transparent coat layer forming coating liquid comprising, as its main component, an inorganic binder composed of silica sol including an alkyl group containing compound having one or more types of alkyl groups selected from long chain alkyl groups containing 7 to 30 carbon atoms; and performing heat treatment.

A seventh aspect of the invention resides in a method of producing the transparent conductive layered structure, according to the sixth aspect, wherein the conductive microparticles are transparent conductive oxide microparticles or/and noble metal microparticles.

An eighth aspect of the invention resides in a method of producing the transparent conductive layered structure, according to the seventh aspect, wherein the transparent conductive oxide microparticles are indium tin oxide or tin antimony oxide.

A ninth aspect of the invention resides in a method of producing the transparent conductive layered structure, according to the seventh aspect, wherein the noble metal microparticles are any of: noble metal microparticles selected from gold, silver, platinum, palladium, rhodium, and ruthenium; alloy microparticles of these noble metals; or noble metal-coated silver microparticles coated with these noble metals other than silver.

A tenth aspect of the invention resides in a method of producing the transparent conductive layered structure, according to the ninth aspect, wherein the noble metal-coated silver microparticles are silver microparticles coated with gold or platinum only or a composite of gold and platinum.

An eleventh aspect of the invention resides in a method of producing the transparent conductive layered structure, according to any of one sixth through tenth aspects, wherein the transparent conductive forming coating liquid includes an inorganic binder comprising, as its main component, silica sol.

Further, twelfth and thirteenth aspects of the invention relate to the invention defining a transparent coat layer forming coating liquid used for the above-mentioned method of producing the transparent conductive layered structure.

That is, the twelfth aspect of the invention resides in a transparent coat layer forming coating liquid used for the method of producing the transparent conductive layered structure according to the sixth aspect, comprising, as its component:

a solvent, an inorganic binder composed of silica sol, and an alkyl group containing compound having one or more types of alkyl groups selected from long chain alkyl groups containing 7 to 30 carbon atoms;

wherein a mixture ratio of the inorganic binder and the alkyl group containing compound is from 0.1 to 20 parts by weight of the alkyl group containing compound to 100 parts by weight of the inorganic binder.

The thirteenth aspect of the invention resides in transparent coat layer forming coating liquid according to the twelfth aspect, wherein the alkyl group containing compound is a compound including, in a molecule, a hydrolyzable alkoxysilyl group or a functional group generated by hydrolysis of the hydrolyzable alkoxysilyl group.

Moreover, the fourteenth aspect of the invention resides in a display device comprising a main apparatus body and a front panel disposed in front thereof, wherein the transparent conductive layered structure according to any of the first through the fifth aspects is incorporated as the front panel with the side of the transparent two-layered film thereof being disposed outside.

DESCRIPTION OF THE PREFERRED EMBODIMENTS

The preferred embodiments of the present invention will now be described in detail.

In a transparent conductive layered structure comprising a transparent two-layered film being composed of a transparent conductive layer and a transparent coat layer being formed in succession on a transparent substrate, the present invention is aimed at improving a coating strength, particularly scratch strength of the above-mentioned transparent two-layered film. That is, when observed microscopically, on the surface of the above-mentioned transparent two-layered film, there exist fine irregularities, which are one of the factors decreasing the scratch strength.

Here, a scratch strength is literally an abrasion resistant strength, which can be evaluated, for example, by a steel wool test, a pencil strength test, a diamond scratch test, etc.

In addition, the present invention was completed based on the discovery that with regard to the above-mentioned transparent coat layer, when this is made of a binder matrix of silicon oxide including a long chain alkyl group, the scratch strength of the transparent two-layered film can be remarkably improved. That is, a long chain alkyl group has such high hydrophobicity that when a transparent coat layer forming coating liquid is applied and dried, portions thereof are oriented on the outer surface of a transparent coat layer comprising as its main component silicon oxide, and therefore the action of the oriented long chain alkyl group can make lubricity of the coating higher. Moreover, it is considered that because the lubricity of the coating becomes higher, the scratch strength can be improved even if there exist fine irregularities on the surface of the transparent coat layer. Furthermore, the layer can also be repellent to water due to the above-mentioned orientation of the hydrophobic long chain alkyl group on the outer surface of the layer.

Here, the above-mentioned long chain alkyl groups should contain 7 to 30 carbon atoms. When carbon atoms are less than 7, there will be a small amount of orientation on the surface, and in addition, even if the long chain alkyl groups are oriented, lubrication action itself that the long chain alkyl groups have will be insufficient and the effect of improving the scratch strength will be small, which will be impractical. In addition, when carbon atoms are more than 30, it might cause a problem in solubility of the alkyl group containing compound having the long chain alkyl groups to the transparent coat layer forming coating liquid or in coatability of the transparent coat layer forming coating liquid, which will not be preferred.

Furthermore, when the above-mentioned alkyl group containing compound has, in a molecule, a hydrolyzable akoxysilyl group or a functional group generated by hydrolysis of the hydrolyzable alkoxysilyl group [—SiR$^1_x$(OR$^2$)$_y$, R$^1$ and R$^2$: $C_nH_{2n-1}$, n=0 to 4, X=0 to 2, Y=3–X], the above-mentioned hydrolyzed alkoxysilyl group will be strongly bound to silica, and therefore the binding between the long chain alkyl group portions oriented on the surface of the transparent coat layer and the binder matrix of silicon oxide will be strong.

For example, in the following Comparative Example 1, pencil hardness of the transparent two-layered film comprising gold-silver binary system microparticles and a silicon oxide binder matrix is 6H, on the other hand, in the case of the transparent two-layered film in Example 1 employing the binder matrix of silicon oxide including an n-decyl group ($C_{10}H_{21}$—) and a trimethylsilyl group [—Si(OCH$_3$)$_3$] (actually, a group [—Si(OH)$_3$] hydrolyzed in the transparent coat layer forming coating liquid occurs), the pencil hardness of 8H results, which represents an excellent scratch strength.

Here, in a transparent coat layer forming coating liquid, a mixture ratio of an alkyl group containing compound having one or more types of alkyl groups selected from long chain alkyl groups containing 7 to 30 carbon atoms is preferably from 0.1 to 20 parts by weight of the alkyl group containing compound to 100 parts by weight of the inorganic binder (SiO$_2$) in a silica sol, and more preferably from 0.3 to 10 parts by weight. When the above-mentioned alkyl group containing compound is less than 0.1 parts by weight, the effect of the above-mentioned long chain alkyl group will be insufficient, and when it is more than 20 parts by weight, the strength of the binder matrix itself will decrease, which will be unpreferred.

Furthermore, the above-mentioned conductive microparticles of the present invention should have a mean particle diameter of 1 to 100. When it is less than 1 nm, it will be difficult to produce these microparticles, and if mean particle diameter exceeds 100 nm, scattering of visible light ray on the formed transparent conductive layer will be so much enhanced that haze value of the film will be too high, which will be impractical.

In addition, the mean particle diameter as used here means the mean particle diameter of microparticles observed under a transmission electron microscope (TEM).

Moreover, for the above-mentioned conductive microparticles included in the transparent conductive layer forming coating liquid of the present invention, transparent conductive oxide microparticles or/and noble metal microparticles is used, and for the above-mentioned transparent conductive oxide microparticles, indium tin oxide or tin antimony oxide can be used, and for the above-mentioned noble metal microparticles, any of: noble metal microparticles selected from gold, silver, platinum, palladium, rhodium, and ruthenium; alloy microparticles of these noble metals; or noble metal-coated silver microparticles the surface of which is coated with these noble metals other than silver can be used.

Here, when specific resistance of silver, gold, platinum, rhodium, palladium, ruthenium etc. is compared, the specific resistance of platinum, rhodium, palladium, and ruthenium is 10.6, 5.1, 10.8, and 6.71 µΩ·cm respectively, which is higher than that of silver and gold being 1.62 and 2.2 µΩ·cm respectively, and therefore use of silver microparticles or gold microparticles is considered to be advantageous in order to form a transparent conductive layer having low surface resistance.

However, when silver microparticles are used, the application will be limited from the aspect of weather resistance wherein degradation by brine or sulfurization is vigorous. On the other hand, when gold microparticles are used, there will be no problem with the above-mentioned weather resistance, but when aspect of cost taken into consideration, the gold microparticles will not always be most preferable.

Accordingly, microparticles wherein on the surface of silver microparticles are coated noble metals other than silver, can be used. For example, the present inventors have already proposed a transparent conductive layer forming coating liquid using noble metal-coated silver microparticles having a mean particle diameter of 1 to 100 nm coated with gold or platinum only or a composite of gold and platinum and the method of producing the same (refer to Japanese Patent Application Laid-Open No. H 11-228872 and the specification of Japanese Patent Application No. H 11-366343).

In addition, for the above-mentioned noble metal-coated silver microparticles, specific resistance of platinum is somewhat higher than that of silver and gold, as previously mentioned, and therefore, as surface resistance of a transparent conductive film, Ag—Au system is more preferable than Ag—Pt system and Ag—Au—Pt system. However, since gold or platinum only or a composite of gold and platinum is used as coating layer on the surface of the above-mentioned sliver microparticles, the good electrical conductivity of the silver is not lost to such an extent that it falls below the level needed for practical application, even if the above-mentioned Ag—Pt system or Ag—Au—Pt system is used.

Next, for the above-mentioned noble metal-coated silver microparticles, the coating amount of gold or platinum only or a composite of gold and platinum is preferably set within a range no less than 5 parts by weight up to 1900 parts by weight to 100 parts by weight of silver, and more preferably set within a range no less than 100 parts by weight up to 900 parts by weight. When the coating amount of gold or platinum only or a composite of gold and platinum is less than 5 parts by weight, deterioration of the film by the influence of ultraviolet rays, etc., tends to occur, and therefore, no protective effect of the coating will be observed, while when it exceeds 1900 parts by weight, productivity of the noble metal-coated silver microparticles will be down as well as there will be prohibition in terms of cost.

Furthermore, when gold or platinum only or a composite of gold and platinum is coated on the surface of silver microparticles, silver within the noble metal-coated silver microparticles will be protected by the gold or platinum only or the composite of gold and platinum, and therefore, weather resistance, chemical resistance, ultraviolet ray resistance, etc., will be markedly improved.

Next, a transparent conductive layer forming coating liquid employing, as conductive microparticles, noble metal microparticles and transparent conductive oxide microparticles used in the present invention can be produced, for example, by the following methods, respectively.

That is, for a transparent conductive layer forming coating liquid employing noble metal microparticles, a colloidal dispersion of silver microparticles is prepared by a conventional method (for instance, the Carey-Lea method, Am. J. Sci., 37, 47(1889), Am. J. Sci., 38(1889)), and then the silver microparticles are coated with gold by adding to this dispersion a reducing agent such as hydrazine, etc. and an aurate solution are added to this dispersion. A dispersion of noble metal-coated silver microparticles can be obtained in this way. Furthermore, a trace of dispersant may be added to either or both of a colloidal dispersion of silver microparticles and an aurate solution during the gold coating process as needed.

Then, it is preferable to lower the electrolyte concentration in the dispersion using a method, such as dialysis, electrodialysis, ion exchange, ultrafiltration, etc. This is because colloids generally aggregate with electrolytes when the electrolyte concentration is high. This phenomenon is known as the Schulze-Hardy rule.

Finally, a coating liquid comprising noble metal-coated silver microparticles is prepared by accomplishing an adjustment of the components (microparticle content, water content, etc.), etc. by concentration of the colloidal dispersion of noble metal-coated silver microparticles, and addition of an organic solvent, etc.

Moreover, for a transparent conductive layer forming coating liquid employing transparent conductive oxide microparticles, transparent conductive oxide microparticles such as indium tin oxide (ITO) microparticles, antimony tin oxide (ATO) microparticles, etc., and a dispersant are added to a solvent, and then a dispersion of conductive oxide microparticles is obtained by dispersion treatment using a paint shaker, a bead mill, ultrasonic wave, etc. A transparent conductive layer forming coating liquid which contains transparent conductive oxide microparticles can be prepared by accomplishing an adjustment of the components (microparticle content, etc.), etc., by addition of an organic solvent, etc.

By using the transparent conductive layer forming coating liquid having conductive microparticles such as noble metal microparticles, transparent conductive oxide microparticles, etc., as prepared in the above-mentioned manner, the following method can be used to form the above-mentioned transparent two-layered film on a transparent substrate.

That is, a transparent conductive layer forming coating liquid which comprises as its main components a solvent and conductive microparticles having a mean particle diameter of 1 to 100 nm dispersed in the solvent is applied by any method, such as spray coating, spin coating, wire bar coating, doctor blade coating, etc., to a transparent substrate, such as a glass substrate, a plastic substrate, etc., and when necessary, after drying, overcoating with a transparent coat layer forming coating liquid which comprises as its main component silica sol including an alkyl group containing compound having one or more types of alkyl groups selected from long chain alkyl groups containing 7 to 30 carbon atoms is performed by the above-mentioned method.

Next, after overcoating, heat treatment is performed at a temperature of, for example, the order of 50 to 250° C. and the transparent coat layer that was overcoated is cured to form the above-mentioned two-layered film.

Improvement of conductivity, improvement of a coating strength, and even further improvement of weather resistance are simultaneously realized here when the transparent coat layer forming coating liquid which comprises as its main component silica sol including the above-mentioned alkyl group containing compound is overcoated by the above-mentioned methods because the silica sol liquid that has been overcoated (this silica sol liquid which includes an alkyl group containing compound having one or more types of alkyl groups selected from long chain alkyl groups containing 7 to 30 carbon atoms becomes the binder matrix which comprises as its main component silicon oxide including the above-mentioned alkyl group with the above-mentioned heat treatment) soaks into the spaces in the transparent microparticles layer that was formed by pre-application of a transparent conductive layer forming coating liquid which comprises as its main component conductive microparticles and finally the binder matrix is strongly bound to the substrate and the conductive microparticles.

In addition, the reflectance of the transparent two-layered film can be markedly reduced by the above-mentioned transparent two-layered structure film of a transparent coat layer and a transparent conductive layer wherein conductive microparticles are dispersed in a binder matrix.

Furthermore, the optical properties, such as reflectance, transmittance, etc., of the above-mentioned transparent two-layered film even when using a binder matrix of silicon oxide which does not include a long chain alkyl group are still excellent in a similar manner when using a binder matrix of silicon oxide which includes a long chain alkyl group. It is considered that this is because there is little change in optical constant of the binder matrix even when introducing a long chain alkyl group into the binder matrix of silicon oxide.

Here, as this silica sol including an alkyl group containing compound having one or more types of alkyl groups selected from long chain alkyl groups containing 7 to 30 carbon atoms, there can be used a polymer obtained by adding water and acid catalyst to orthoalkyl silicate and alkyl group containing silicon compounds, such as n-octyltrimethoxysilane, n-octyltriethoxysilane, n-decyltrimethoxysilane, n-hexadecyltrimethoxysilane, n-octadecyltrimethoxysilane, n-octadecylmethyldimethoxysilane, n-octadecyltrimethoxysilane, etc., for hydrolysis and then promoting dehydropolycondensation, or a mixture obtained by adding the above-mentioned alkyl group containing silicon compounds to a polymer (silica sol) obtained by adding water and acid catalyst to a commercial alkyl silicate solution already hydrolyzed and promoted through polymerization up to a tetramer or pentamer, for further hydration and then promoting dehydropolycondensation, etc.

When being added to silica sol, the alkoxysilyl group portions in the above-mentioned alkyl group containing silicon compounds are hydrolyzed within several hours to several days. The above-mentioned transparent coat layer forming coating liquid is preferably used after this hydrolysis. Furthermore, when dehydropolycondensation is promoted, the solution viscosity rises until it finally solidifies and therefore, the degree of dehydropolycondensation is adjusted to the upper viscosity limit with which application to a transparent substrate, such as a glass substrate, plastic substrate, etc., is possible or lower. There are no particular specifications for the degree of dehydropolycondensation as long as it is at the level of the this limit or lower.

Moreover, the alkyl silicate hydrolyzed polymer including the above-mentioned long chain alkyl group forms a cured silicate film (film comprising as its main component a binder matrix of silicon oxide including one or more types of alkyl groups selected from long chain alkyl groups containing 7 to 30 carbon atoms), with the dehydropolycondensation reaction all but completed, during heating and baking of the transparent two-layered film.

Furthermore, the refractive index of the transparent coat layer can be adjusted to change the reflectance of the transparent two-layered film by adding magnesium fluoride microparticles, alumina sol, titanic sol, zirconia sol, etc., to the above-mentioned silica sol including an alkyl group containing compound having one or more types of alkyl groups selected from long chain alkyl groups containing 7 to 30 carbon atoms.

In addition, in the process for forming the above-mentioned transparent conductive layer, the above-mentioned transparent conductive layer forming coating liquid made by mixing a silica sol liquid as the inorganic binder component that makes up the binder matrix in addition to the solvent and the conductive microparticles having a mean particle diameter of 1 to 100 nm dispersed in this solvent may be used. In this case also, the same above-mentioned transparent two-layered film is obtained by applying the transparent conductive layer forming coating liquid comprising a silica sol liquid and when necessary, after drying, overcoating a transparent coat layer forming coating liquid by the above-mentioned method.

Furthermore, in the process for forming the above-mentioned transparent conductive layer, the above-mentioned transparent conductive layer forming coating liquid made by mixing a polymer resin in addition to the solvent and the conductive microparticles having a mean particle diameter of 1 to 100 nm dispersed in this solvent may be used. When a polymer resin is added, conductive microparticles in the transparent conductive layer forming coating liquid can be stabilized and longer pot life of the transparent conductive layer forming coating liquid can be obtained. However, since strength and weather resistance of the transparent conductive film that is obtained tend to be somewhat lower, attention should be given when employing the polymer resin.

Moreover, in order to make the display screen easier to see by adjusting the transmittance of the above-mentioned transparent two-layered film to the predetermined range (40 to 75%) lower than 100%, color pigment microparticles, etc., may be mixed into the above-mentioned transparent conductive layer forming coating liquid. For example, one or more types of microparticles selected from carbon, titanium black, titanium nitride, composite oxide pigment, cobalt violet, molybdenum orange, ultramarine, Prussian blue, quinacridone pigment, anthraquinone pigment, perylene pigment, isoindolinone pigment, azo pigment, and phthalocyanine pigment, etc., can be used as the above-mentioned color pigment microparticles.

As described above, a transparent conductive layered structure according to the present invention, as compared to the conventional ones, has an excellent coating strength and weather resistance. Moreover it has an excellent anti-reflection activity and transmission profile, and also has antistatic or electric field-shielding activity. Thus, it can be used, for example, as a front panel, etc., of display devices, such as CRTs, plasma display panels (PDPs), vacuum fluorescent displays (VFDs), field emission displays (FEDs), electroluminescence displays (ELDs), liquid crystal displays (LCDs), etc.

EXAMPLES

Examples of the present invention will now be explained in the concrete, but the present invention is not limited to these examples. Moreover, the "%" in this text are "wt %" with the exception of the (%) used for transmittance, reflectance and haze value, and the "parts" are "parts by weight."

Example 1

A colloidal dispersion of silver microparticles was prepared by the above-mentioned Carey-Lea method.

In the concrete, after adding a mixed solution of 39 g aqueous 23% iron sulfate (II) solution and 48 g aqueous 37.5% sodium citrate solution to 33 g aqueous 9% silver nitrate solution, the precipitate was filtered and washed. Then pure water was added to prepare a colloidal dispersion of silver microparticles (Ag: 0.15%).

Next, a mixed solution of 8.0 g aqueous 1% hydrazine monohydrate ($N_2H_4.H_2O$), 480 g aqueous potassium aurate [$KAu(OH)_4$] solution (Au: 0.075%) and 0.2 g aqueous 1% polymer dispersant solution was added while agitating to 60 g of this colloidal dispersion of silver microparticles to obtain a colloidal dispersion of noble metal-coated silver microparticles.

Once desalting of this colloidal dispersion of noble metal-coated silver microparticles was performed with an ion-exchange resin (Diaion SK1B, SA20AP; brand names of Mitsubishi Chemical Corporation), ultrafiltration was performed, and to the concentrated dispersion of the noble metal-coated silver microparticles which was obtained, ethanol (EA), propylene glycol monomethyl ether (PGM), diacetone alcohol (DAA) and formamide (FA) were added to obtain a transparent conductive layer forming coating liquid that contains noble metal-coated silver microparticles (Ag: 0.08%, Au: 0.32%, water: 10.7%, EA: 53.8%, PGM: 25%, DAA: 10%, FA: 0.1%).

As a result of observing this obtained transparent conductive layer forming coating liquid under a transmission electron microscope, the mean particle diameter of the noble metal-coated silver microparticles was 7.5 nm.

Next, this transparent conductive layer forming coating liquid was spin coated (150 rpm, 60 seconds) onto a glass substrate (soda lime glass with a thickness of 3 mm) that had been heated to 40° C. and then a transparent coat layer forming coating liquid was spin coated (150 rpm, 60 seconds) and the product was further cured for 20 minutes at 180° C. to obtain a glass substrate with a transparent two-layered film composed of a transparent conductive layer comprising noble metal-coated silver microparticles and a binder matrix of silicon oxide and a transparent coat layer consisting of silicate film comprising as its main component silicon oxide including a long chain alkyl group, that is, the transparent conductive layered structure of Example 1.

Here, the above-mentioned transparent coat layer forming coating liquid was obtained as follows.

The silica sol liquid was obtained by preparing, first, a substance with an $SiO_2$ (silicon oxide) solid content of 10% and a weight-average molecular weight of 1.190 using 19.6 parts Methyl Silicate 51 (Colcoat Co., Ltd., brand name), 57.8 parts ethanol, 7.9 parts aqueous 1% nitric acid solution, and 14.7 parts pure water and then diluting this with a mixture of isopropyl alcohol (IPA) and n-butanol (NBA) (IPA/NBA=3/1) to a final $SiO_2$ solid content of 0.8%. To this silica sol liquid, n-decyltrimethoxysilane [$C_{10}H_{21}Si(OCH_3)_3$] was added to obtain a transparent coat layer forming coating liquid which includes 0.3 parts by weight of n-decyltrimethoxysilane [$C_{10}H_{21}Si(OCH_3)_3$] to 100 parts by weight of the inorganic binder ($SiO_2$) in the silica sol liquid.

In addition, film properties of the transparent two-layered film formed on the glass substrate (surface resistance, visible light ray transmittance, standard deviation of transmittance, haze value, bottom reflectance/bottom wavelength, and pencil hardness) are shown in Table 1 below.

Furthermore, the above-mentioned bottom reflectance means minimum reflectance in the reflection profile of the transparent conductive layered structure, and the bottom wavelength means the wavelength when reflectance is at its minimum.

Moreover, the above-mentioned pencil hardness is evaluated by observing abrasions occurred when limes are drawn on the surface of the transparent two-layered film with pencils having a hardness of H to 9H under a load of 1 kg.

Furthermore, transmittance of the transparent two-layered film only without the transparent substrate (glass substrate) at each wavelength in 5 nm intervals of the visible light ray wavelength region (380 to 750 nm) in Table 1 is found as follows.: That is, Transmittance of transparent two-layered film only without transparent substrate (%)=[(transmittance determined inclusive of transparent substrate)/(transmittance of transparent substrate)]×100.

Unless otherwise noted, here the value of transmittance of the transparent two-layered film only without the transparent substrate is used as the transmittance in the present specification.

Moreover, surface resistance of the transparent two-layered film was determined using the surface resistance meter (Loresta AP MCP-T400) of Mitsubishi Chemical Corporation.

Furthermore, the above-mentioned haze value and visible light ray transmittance were determined using a haze meter (HR-200) made by Murakami Color Research Laboratory, and further the above-mentioned reflectance and standard deviation of transmittance were determined using spectrophotometer (U-4000) made by Hitachi Ltd. In addition, particle diameter of the noble metal-coated silver microparticles that are conductive microparticles was evaluated under a transmission electron microscope made by JEOL Ltd.

Example 2

Other than the fact that n-decyltrimethoxysilane was added to obtain a transparent coat layer forming coating liquid as in Example 1 which includes 1.0 parts by weight of n-decyltrimethoxysilane to 100 parts by weight of the inorganic binder ($SiO_2$) in the silica sol liquid, the same treatment as in Example 1 was performed to obtain a glass substrate with a transparent two-layered film composed of a transparent conductive layer comprising noble metal-coated silver microparticles that are conductive microparticles and a binder matrix of silicon oxide and a transparent coat layer consisting of silicate film comprising as its main component silicon oxide including a long chain alkyl group, that is, the transparent conductive layered structure of Example 2.

The above-mentioned film properties of the transparent two-layered film formed on the glass substrate are shown in Table 1 below.

Example 3

Other than the fact that n-decyltrimethoxysilane was added to obtain a transparent coat layer forming coating liquid as in Example 1 which includes 5.0 parts by weight of n-decyltrimethoxysilane to 100 parts by weight of the inorganic binder ($SiO_2$) in the silica sol liquids the same treatment as in Example 1 was performed to obtain a glass substrate with a transparent two-layered film composed of a transparent conductive layer comprising noble metal-coated silver microparticles that are conductive microparticles and a binder matrix of silicon oxide and a transparent coat layer consisting of silicate film comprising as its main component silicon oxide including a long chain alkyl group, that is, the transparent conductive layered structure of Example 3.

The above-mentioned film properties of the transparent two-layered film formed on the glass substrate are shown in Table 1 below.

Example 4

Other than the fact that 0.01 parts by weight of an acrylic system polymer resin was added to 100 parts by weight of a transparent conductive layer forming coating liquid as in Example 2, the same treatment as in Example 2 was performed to obtain a glass substrate with a transparent two-layered film composed of a transparent conductive layer comprising noble metal-coated silver microparticles that are conductive microparticles, a polymer resin and a binder matrix of silicon oxide and a transparent coat layer consisting of silicate film comprising as its main component silicon oxide including a long chain alkyl group, that is, the transparent conductive layered structure of Example 4.

The above-mentioned film properties of the transparent two-layered film formed on the glass substrate are shown in Table 1 below.

Example 5

Other than the fact that n-octyltrimethoxysilane [$C_8H_{17}Si(OCH_3)_3$] was added to obtain a transparent coat layer forming coating liquid as in Example 1 which includes 0.5 parts by weight of n-octyltrimethoxysilane to 100 parts by weight of the inorganic binder ($SiO_2$) in the silica sol liquid, the same treatment as in Example 1 was performed to obtain a glass substrate with a transparent two-layered film composed of a transparent conductive layer comprising noble metal-coated silver microparticles that are conductive microparticles and a binder matrix of silicon oxide and a transparent coat layer consisting of silicate film comprising as its main component silicon oxide including a long chain alkyl group, that is, the transparent conductive layered structure of Example 5.

The above-mentioned film properties of the transparent two-layered film formed on the glass substrate are shown in Table 1 below.

Example 6

Other than the fact that n-octyltrimethoxysilane was added to obtain a transparent coat layer forming coating liquid as in Example 1 which includes 1.0 parts by weight of n-octyltrimethoxysilane to 100 parts by weight of the inorganic binder ($SiO_2$) in the silica sol liquid, the same treatment as in Example 1 was performed to obtain a glass substrate with a transparent two-layered film composed of a transparent conductive layer comprising noble metal-coated silver microparticles that are conductive microparticles and a binder matrix of silicon oxide and a transparent coat layer consisting of silicate film comprising as its main component silicon oxide including a long chain alkyl group, that is, the transparent conductive layered structure of Example 6.

The above-mentioned film properties of the transparent two-layered film formed on the glass substrate are shown in Table 1 below.

Example 7

Other than the fact that n-hexadecyltrimethoxysilane [$C_{16}H_{33}Si(OCH_3)_3$] was added to obtain a transparent coat layer forming coating liquid as In Example 1 which includes 1.0 parts by weight of n-hexadecyltrimethoxysilane to 100 parts by weight of the inorganic binder ($SiO_2$) in the silica sol liquid, the same treatment as in Example 1 was performed to obtain a glass substrate with a transparent two-layered film composed of a transparent conductive layer comprising noble metal-coated silver microparticles that are conductive microparticles and a binder matrix of silicon oxide and a transparent coat layer consisting of silicate film comprising as its main component silicon oxide including a long chain alkyl group, that is, the transparent conductive layered structure of Example 7.

The above-mentioned film properties of the transparent two-layered film formed on the glass substrate are shown in Table 1 below.

Example 8

After mixing 20.0 g of ITO microparticles (SUFP-HX, made by Sumitomo Metal Mining Co., Ltd.) having a mean particle diameter of 30 nm and 1.5 g of a dispersant, with 78.5 g of ethanol, dispersion treatment using a paint shaker with zirconia beads was performed to obtain a dispersion of ITO microparticles having a dispersion particle diameter of 105 nm.

Ethanol (EA), propylene glycol monomethyl ether (PGM) and diacetone alcohol (DAA) were added to this dispersion of ITO microparticles to obtain a transparent conductive layer forming coating liquid that contains ITO microparticles (ITO: 2.0%, EA: 82.8%, PGM: 10.0%, DAA: 5.0%).

Then, other than the fact that the above-mentioned transparent conductive layer forming coating liquid that contains ITO microparticles was used as a transparent conductive layer forming coating liquid as in Example 2, the same treatment as in Example 2 was performed to obtain a glass substrate with a transparent two-layered film composed of a transparent conductive layer comprising ITO microparticles that are conductive microparticles and a binder matrix of silicon oxide and a transparent coat layer consisting of silicate film comprising as its main component silicon oxide including a long chain alkyl group, that is, the transparent conductive layered structure of Example 8.

The above-mentioned film properties of the transparent two-layered film formed on the glass substrate are shown in Table 1 below.

Comparative Example 1

Other than the fact that a silica sol liquid without addition of a long chain alkyl group containing silicon compound (n-decyltrimethoxysilane) was used as a transparent coat layer forming coating liquid as in Example 1, the same treatment as in Example 1 was performed to obtain a glass substrate with a transparent two-layered film composed of a transparent conductive layer comprising noble metal-coated silver microparticles that are conductive microparticles and a binder matrix of silicon oxide and a transparent coat layer consisting of silicate film comprising as its main component silicon oxide, that is, the transparent conductive layered structure of Comparative Example 1.

The above-mentioned film properties of the transparent two-layered film formed on the glass substrate are shown in Table 1 below.

Comparative Example 2

Other than the fact that a silica sol liquid without addition of a long chain alkyl group containing silicon compound (n-decyltrimethoxysilane) was used as a transparent coat layer forming coating liquid as in Example 4, the same treatment as in Example 4 was performed to obtain a glass substrate with a transparent two-layered film composed of a transparent conductive layer comprising noble metal-coated silver microparticles that are conductive microparticles, a polymer resin, and a binder matrix of silicon oxide and a transparent coat layer consisting of silicate film comprising as its main component silicon oxide, that is, the transparent conductive layered structure of Comparative Example 2.

The above-mentioned film properties of the transparent two-layered film formed on the glass substrate are shown in Table 1 below.

Comparative Example 3

Other than the fact that n-hexyltrimethoxysilane [$C_6H_{13}Si(OCH_3)_3$] was added to obtain a transparent coat layer forming coating liquid as in Example 1 which includes 1.0 parts by weight of n-hexyltrimethoxysilane to 100 parts by weight of the inorganic binder ($SiO_2$) in the silica sol liquid, the same treatment as in Example 1 was performed to obtain a glass substrate with a transparent two-layered film composed of a transparent conductive layer comprising noble metal-coated silver microparticles that are conductive microparticles and a binder matrix of silicon oxide and a transparent coat layer consisting of silicate film comprising as its main component silicon oxide including alkyl group, that is, the transparent conductive layered structure of Comparative Example 3.

The above-mentioned film properties of the transparent two-layered film formed on the glass substrate are shown In Table 1 below.

Comparative Example 4

Other than the fact that a silica sol liquid without addition of a long chain alkyl group containing silicon compound (n-decyltrimethoxysilane) was used as a transparent coat layer forming coating liquid as in Example 8, the same treatment as in Example 8 was performed to obtain a glass substrate with a transparent two-layered film composed of a transparent conductive layer comprising ITO microparticles that are conductive microparticles, and a binder matrix of silicon oxide and a transparent coat layer consisting of silicate film comprising as its main component silicon oxide, that is, the transparent conductive layered structure of Comparative Example 4.

The above-mentioned film properties of the transparent two-layered film formed on the glass substrate are shown in Table 1.

TABLE 1

| | | | Transparent coat layer forming coating liquid | | | | Visible | Standard | | | |
| | | | | | | light | deviation | Bottom | | | |
| | | | Alkyl group containing compound | | | Surface | ray | of | | reflectance | |
| | Type of | | | | Mixture | resist- | transmit- | transmit- | Haze | (%)/bottom | |
| | micro-particles | Gold content | Alkyl group | Alkoxysilyl group (Note 1) | ratio (Note 2) | ance ($\Omega/\square$) | tance (%) | tance (Note 3) | value (%) | wavelength (nm) | Pencil hardness |
|---|---|---|---|---|---|---|---|---|---|---|---|
| Example 1 | Ag—Au | 80 wt % | $C_{10}H_{21}$— | —$Si(OR)_3$ | 0.3 | 195 | 80.5 | 1.42 | 0.1 | 0.04/570 | 8H |
| Example 2 | Ag—Au | 80 wt % | $C_{10}H_{21}$— | —$Si(OR)_3$ | 1.0 | 192 | 80.1 | 1.46 | 0.1 | 0.09/575 | 8H |
| Example 3 | Ag—Au | 80 wt % | $C_{10}H_{21}$— | —$Si(OR)_3$ | 5.0 | 203 | 80.9 | 1.50 | 0.1 | 0.12/375 | 8H |
| Example 4 | Ag—Au | 80 wt % | $C_{10}H_{21}$— | —$Si(OR)_3$ | 1.0 | 210 | 80.3 | 1.51 | 0.1 | 0.18/565 | 8H |
| Example 5 | Ag—Au | 80 wt % | $C_8H_{17}$— | —$Si(OR)_3$ | 0.5 | 189 | 79.9 | 1.53 | 0.1 | 0.03/570 | 8H |
| Example 6 | Ag—Au | 80 wt % | $C_8H_{17}$— | —$Si(OR)_3$ | 1.0 | 197 | 80.5 | 1.45 | 0.1 | 0.08/580 | 8H |
| Example 7 | Ag—Au | 80 wt % | $C_{16}H_{33}$— | —$Si(OR)_3$ | 1.0 | 223 | 81.3 | 1.40 | 0 | 0.22/560 | 8H |
| Example 8 | ITO | — | $C_{10}H_{21}$— | —$Si(OR)_3$ | 1.0 | 15600 | 100 | — | 0.1 | 0.83/595 | 9H |
| Comparative Example 1 | Ag—Au | 80 wt % | None | —$Si(OR)_3$ | 0 | 199 | 80.6 | 1.45 | 0.1 | 0.16/570 | 6H |
| Comparative Example 2 | Ag—Au | 80 wt % | None | —$Si(OR)_3$ | 0 | 213 | 80.8 | 1.52 | 0.1 | 0.17/565 | 6H |
| Comparative Example 3 | Ag—Au | 80 wt % | $C_6H_{13}$— | —$Si(OR)_3$ | 1.0 | 193 | 80.1 | 1.47 | 0.1 | 0.06/565 | 6H |
| Comparative Example 4 | ITO | — | None | —$Si(OR)_3$ | 0 | 15000 | 100 | — | 0.1 | 0.85/590 | 7H |

Note 1:
R is methyl group
Note 2:
Parts by weight of an alkyl group containing compound to 100 parts by weight of an inorganic binder ($SiO_2$).
Note 3:
Value in terms of the transmittance (%) of the transparent two-layered film only without the transparent substrate At each wavelength in 5 nm intervals in the visible light ray wavelength region (360 to 780 nm).

[Chemical Resistance Test]

The transparent conductive layered structures of Example 1 through 7 and the transparent conductive layered structures of Comparative Examples 1 through 3 were immersed in 5% brine for 24 hours and surface resistance and film appearance of the transparent two-layered film on the transparent substrate (glass substrate) were investigated. However, no change was observed.

[Water-Repellency Examination of Films]

Water-repellency of the transparent two-layered films of Examples 1 through 8 and Comparative Examples 1, 2 and 4 was evaluated by observing the water-repellent extent of ethanol (actually a mixture of ethanol and water because ethanol absorbs moisture in the air), after applying and spreading ethanol on the two-layered films with a cloth which had been infiltrated with ethanol. It was observed that ethanol which had been spread thereon was rapidly repelled like beads, on the transparent two-layered films of Examples 1 through 8, while the above-mentioned repellance like beads was not observed on the films of Comparative Examples 1.2 and 4.

[Evaluation]

(1) As is clear from the results shown in Table 1, the surface resistance (Ω/□) and the visible light ray transmittance of the transparent two-layered film according to Examples 1 through 7 show very excellent properties as similar to those values of the transparent two-layered film according to Comparative Examples 1 through 3. Moreover, the similar results were observed in a comparison between Example 8 and Comparative Example 4.

Next, the pencil hardness of the transparent two-layered film according to Examples 1 through 7 is more excellent when compared to the values (of 3H to 6H) of the transparent two-layered film according to Comparative Examples 1 through 3. Moreover, the similar results were observed in a comparison between Example 8 and Comparative Example 4.

That is, it is confirmed that the coating strength of the transparent two-layered film is substantially improved due to the introduction of long chain alkyl groups containing 7 to 30 carbon atoms into the transparent coat layer in each Example.

(2) Additionally, from the results in the above-mentioned chemical resistance tests, it is also confirmed that the transparent two-layered film according to Examples 1 through 7, even when long chain alkyl groups containing 7 to 30 carbon atoms are introduced into the transparent coat layer, has an excellent weather resistance as similar to the values of the transparent two-layered film according to Comparative Examples 1 through 3.

(3) As is seen from the results of water-repellency examination of films, the transparent two-layered films of Examples 1 through 8 were rendered to be repellent to water so that the effect of preventing water from penetrating into the films can be expected.

According to the transparent conductive layered structure of the present invention as described in the first through fifth aspects, since a transparent coat layer that constitutes one layer of the transparent two-layered film comprises as its main component a binder matrix of silicon oxide including one or more types of alkyl groups selected from long chain alkyl groups containing 7 to 30 carbon atoms, the transparent conductive layered structure of the present invention as described in the first through fifth aspects, when compared to the conventional transparent conductive layered structure, has an excellent coating strength (scratch strength) and also has good conductivity and weather resistance and an excellent anti-reflection activity.

Moreover, according to the method of producing the transparent conductive layered structure of the present invention as described in the sixth through eleventh aspects, since the method comprises the steps of: applying on a transparent substrate a transparent conductive layer forming coating liquid comprising, as its main components, a solvent and noble metal microparticles having a mean particle diameter of 1 to 100 nm dispersed in the solvent; then applying a transparent coat layer forming coating liquid comprising, as its main component, an inorganic binder composed of silica sol including an alkyl group containing compound having one or more types of alkyl groups selected from long chain alkyl groups containing 7 to 30 carbon atoms; and performing heat treatment, the method has the advantage of producing the transparent conductive layered structure according to the first through fifth aspects with low cost and usefully.

Furthermore, according to the transparent coat layer forming coating liquid of the present invention as described in the twelfth and thirteenth aspects, since the coating liquid comprising, as its component: a solvent, an inorganic binder composed of silica sol, and an alkyl group containing compound having one or more types of alkyl groups selected from long chain alkyl groups containing 7 to 30 carbon atoms; wherein a mixture ratio of the inorganic binder and the alkyl group containing compound is set from 0.1 to 20 parts by weight of the alkyl group containing compound to 100 parts by weight of the inorganic binder, the coating liquid has the effect of being applied to the method of producing the transparent conductive layered structure according to the first through fifth aspects.

Additionally, according to the display device of the present invention as described in the fourteenth aspect, since the transparent conductive layered structure according to any of the first through fifth aspects is incorporated as a front panel with the side of the transparent two-layered film thereof being disposed outside, surface reflection on the screen is prevented and the display device has high antistatic or electric field-shielding activity.

What is claimed is:

1. A transparent conductive layered structure, comprising a transparent substrate and a transparent two-layered film being composed of a transparent conductive layer and a transparent coat layer being formed in succession on the transparent substrate and being cured by performing a heat treatment at 50 to 250° C.;

wherein the transparent conductive layer comprises, as its main components, conductive microparticles having a mean particle diameter of 1 to 100 nm and a binder matrix of silicon oxide, and wherein the transparent coat layer comprises, as its main component, a binder matrix of silicon oxide including one or more types of alkyl groups selected from long chain alkyl groups containing 7 to 30 carbon atoms, and said alkyl groups being present in the transparent coat layer of the cured transparent conductive layered structure.

2. A transparent conductive layered structure according to claim 1, wherein the conductive microparticles are transparent conductive oxide microparticles or/and noble metal microparticles.

3. A transparent conductive layered structure according to claim 2, wherein the transparent conductive oxide microparticles are indium tin oxide or tin antimony oxide.

4. A transparent conductive layered structure according to claim 2, wherein the noble metal microparticles are any of: noble metal microparticles selected from gold, silver, platinum, palladium, rhodium, and ruthenium; alloy microparticles of these noble metals; or noble metal-coated silver microparticles the surface of which is coated with these noble metals other than silver.

5. A transparent conductive layered structure according to claim 4, wherein the noble metal-coated silver microparticles are silver microparticles coated with gold or platinum only or a composite of gold and platinum.

* * * * *

UNITED STATES PATENT AND TRADEMARK OFFICE
CERTIFICATE OF CORRECTION

| | | |
|---|---|---|
| PATENT NO. | : 7,135,223 B2 | Page 1 of 1 |
| APPLICATION NO. | : 10/694753 | |
| DATED | : November 14, 2006 | |
| INVENTOR(S) | : Atsushi Tofuku and Masaya Yukinobu | |

It is certified that error appears in the above-identified patent and that said Letters Patent is hereby corrected as shown below:

On the Title page, at "(*)" Notice:, delete "This patent is subject to a terminal disclaimer".

Signed and Sealed this

Thirteenth Day of March, 2007

JON W. DUDAS
*Director of the United States Patent and Trademark Office*